(12) United States Patent
Bachman et al.

(10) Patent No.: US 12,314,304 B1
(45) Date of Patent: May 27, 2025

(54) AUTOMATED DATA MAPPING USING SEMANTIC COMPARISONS AND ARTIFICIAL INTELLIGENCE

(71) Applicant: Boomi, LP, Conshohocken, PA (US)

(72) Inventors: Michael Bachman, Bala Cynwyd, PA (US); Swagata Ashwani, Foster City, CA (US); Chris Cappetta, Fort Collins, CO (US); Eric Fennell, Cambridge, MA (US); Prakhar Amlathe, Santa Clara, CA (US)

(73) Assignee: Boomi, LP, Conshohocken, PA (US)

( * ) Notice: Subject to any disclaimer, the term of this patent is extended or adjusted under 35 U.S.C. 154(b) by 0 days.

(21) Appl. No.: 18/736,134

(22) Filed: Jun. 6, 2024

(51) Int. Cl.
| | |
|---|---|
| *G06F 16/00* | (2019.01) |
| *G06F 16/3329* | (2025.01) |
| *G06F 16/358* | (2025.01) |
| *G06F 16/383* | (2019.01) |

(52) U.S. Cl.
CPC ........ *G06F 16/358* (2019.01); *G06F 16/3329* (2019.01); *G06F 16/383* (2019.01)

(58) Field of Classification Search
CPC ... G06F 16/358; G06F 16/3329; G06F 16/383
USPC .......................................................... 707/722
See application file for complete search history.

(56) References Cited

U.S. PATENT DOCUMENTS

| | | | |
|---|---|---|---|
| 8,943,076 B2 | 1/2015 | Stewart et al. | |
| 11,768,837 B1 * | 9/2023 | Newman | G06N 5/02 707/722 |
| 2023/0409614 A1 * | 12/2023 | Hamilton | G06F 16/9024 |

* cited by examiner

*Primary Examiner* — Chelcie L Daye
(74) *Attorney, Agent, or Firm* — Procopio, Cory, Hargreaves & Savitch LLP

(57) ABSTRACT

Currently, technical expertise is required to construct data maps between data sources and targets within integration processes. Disclosed embodiments enable automated generation of data maps using semantic comparisons and artificial intelligence. In particular, data may be converted into reference vector embeddings that define a semantic location of the data within a multi-dimensional vector space. User requests may be converted into input vector embeddings, based on source and target information. The input vector embeddings may be semantically compared to the reference vector embeddings, potentially using a graph database, to identify semantically similar data. This semantically similar data may then be used to generate a prompt, which may be input to a generative language model to automatically produce a data map for use in an integration process.

20 Claims, 6 Drawing Sheets

AUTOMATED DATA MAPPING USING SEMANTIC COMPARISONS AND ARTIFICIAL INTELLIGENCE

BACKGROUND

Field of the Invention

The embodiments described herein are generally directed to data mapping, and, more particularly, to automated data mapping using semantic comparisons and artificial intelligence.

Description of the Related Art

Integration platform as a service (iPaaS) enables the integration of applications and data. The iPaaS platform provided by Boomi® of Conshohocken, Pennsylvania, enables a user to construct integration processes on a virtual canvas from pre-built steps, represented by "shapes," which each has a set of configuration properties. Each step dictates how an integration process retrieves data, transforms or otherwise manipulates data, routes or maps data, sends data, and/or the like. These steps can be connected together in endless combinations to build anywhere from simple to very complex integration processes.

Recently, there has been a major push to simplify business processes. In particular, it is advantageous when workers can perform daily tasks without requiring special skills or training. This simplifies onboarding and empowers workers to be as efficient and productive as possible.

However, the technical knowledge required to construct integration processes is a barrier to simplifying (e.g., automating) the management of integration platforms. When constructing an integration process, novice users often have to go through multiple iterations of trial and error before achieving a successful implementation. In many cases, the user will have to pore through documentation and/or consult with subject-matter experts or integration experts, in order to design and develop an effective integration process. There is a large learning curve for such users.

While the construction of integration processes has been significantly simplified by companies such as Boomi®, one area that still requires specific technical expertise is data mapping. Data mapping refers to mapping source data (e.g., a source data structure output by a source entity) to target data (e.g., a target data structure to be input to a target entity). While there are existing solutions that automate data mapping, these solutions rely on deterministic rules and require static paths. The present disclosure is directed to overcoming these and other problems with state-of-the-art solutions.

SUMMARY

Systems, methods, and non-transitory computer-readable media are disclosed for automated data mapping using semantic comparisons and artificial intelligence.

In an embodiment, a method comprises using at least one hardware processor to: for each of a plurality of data items, determine a reference vector embedding for the data item that defines a semantic location of the data item within a vector space, wherein the vector space has a plurality of dimensions, and store the data item in association with the reference vector embedding within a data store; generate a graph database that comprises a plurality of nodes and a plurality of edges, wherein each of the plurality of nodes represents a cluster of reference vector embeddings for a subset of the plurality of data items, and wherein each of the plurality of edges represents a relationship between a connected pair of the plurality of nodes; and for each of one or more user requests for a data map, each user request comprising source information and target information, determine at least one input vector embedding within the vector space based on the source information and the target information, search one or both of the reference vector embeddings in the data store or the graph database to identify one or more reference vector embeddings that are semantically similar to the at least one input vector embedding based on a similarity metric, retrieve a subset of the plurality of data items associated with the identified one or more reference vector embeddings, generate a prompt based on the subset of data items, input the prompt to a generative language model to generate the data map, and output the data map. The generative language module may be a large language model.

The source information may identify at least one data source, wherein the target information identifies at least one data target. Generating the prompt may comprise incorporating one or both of an identity of the at least one data source or an identity of the at least one data target into the prompt. One or both of: the at least one data source may be a plurality of data sources; or the at least one data target may be a plurality of data targets. The at least one data source may comprise a memory cache. The source information may comprise a source profile, identifying one or more source entities in source data to be provided by at least one data source, and the target information may comprise a target profile, identifying one or more target entities in target data to be provided to at least one data target. Generating the prompt may comprise incorporating one or both of the source profile or the target profile into the prompt. The data map may comprise, for at least one of the one or more source entities in the source profile, a path definition that defines a path between the at least one source entity and a respective target entity in the target profile. The path definition may define a direct path between the at least one source entity and the respective target entity. The path definition may define one or more functions that transform the at least one source entity into the respective target entity. The one or more source entities may be a plurality of source entities, wherein the one or more target entities are a plurality of target entities, and wherein the data map comprises: for a first one of the plurality of source entities, a first path definition that defines a direct path between the first source entity and a first one of the plurality of target entities; and for a second one of the plurality of source entities, a second path definition that defines one or more functions that transform the second source entity into a second one of the plurality of target entities.

The plurality of data items may comprise one or more of a data definition, path information, or documentation. The plurality of data items may comprise one or more of source code, a function description, a script, or an application programming interface (API) definition.

Outputting the data map may comprise displaying a visual representation of the data map within a graphical user interface, wherein the visual representation of the data map comprises visual identifiers of one or more source entities and one or more target entities, and a visual representation of a path between at least one of the one or more source entities and at least one of the one or more target entities. When the path comprises a function that transforms the at least one source entity into the at least one target entity, the visual representation of the path may comprise a visual representation of the function, wherein the visual representation of the function depicts one or more inputs to the function and one or more outputs from the function.

The method may further comprise using the at least one hardware processor to, for each of the one or more user requests, incorporate the data map into an integration process at a position between at least one data source and at least one data target in the integration process. The method may further comprise using the at least one hardware processor to, for at least one of the one or more user requests, deploy the data map to map data from at least one data source to at least one data target in real time.

It should be understood that any of the features in the methods above may be implemented individually or with any subset of the other features in any combination. Thus, to the extent that the appended claims would suggest particular dependencies between features, disclosed embodiments are not limited to these particular dependencies. Rather, any of the features described herein may be combined with any other feature described herein, or implemented without any one or more other features described herein, in any combination of features whatsoever. In addition, any of the methods, described above and elsewhere herein, may be embodied, individually or in any combination, in executable software modules of a processor-based system, such as a server, and/or in executable instructions stored in a non-transitory computer-readable medium.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for automated data mapping using semantic comparisons and artificial intelligence. After reading this description, it will become apparent to one skilled in the art how to implement the invention in various alternative embodiments and alternative applications. However, although various embodiments of the present invention will be described herein, it is understood that these embodiments are presented by way of example and illustration only, and not limitation. As such, this detailed description of various embodiments should not be construed to limit the scope or breadth of the present invention as set forth in the appended claims.

1. Example Infrastructure

Figure 1:
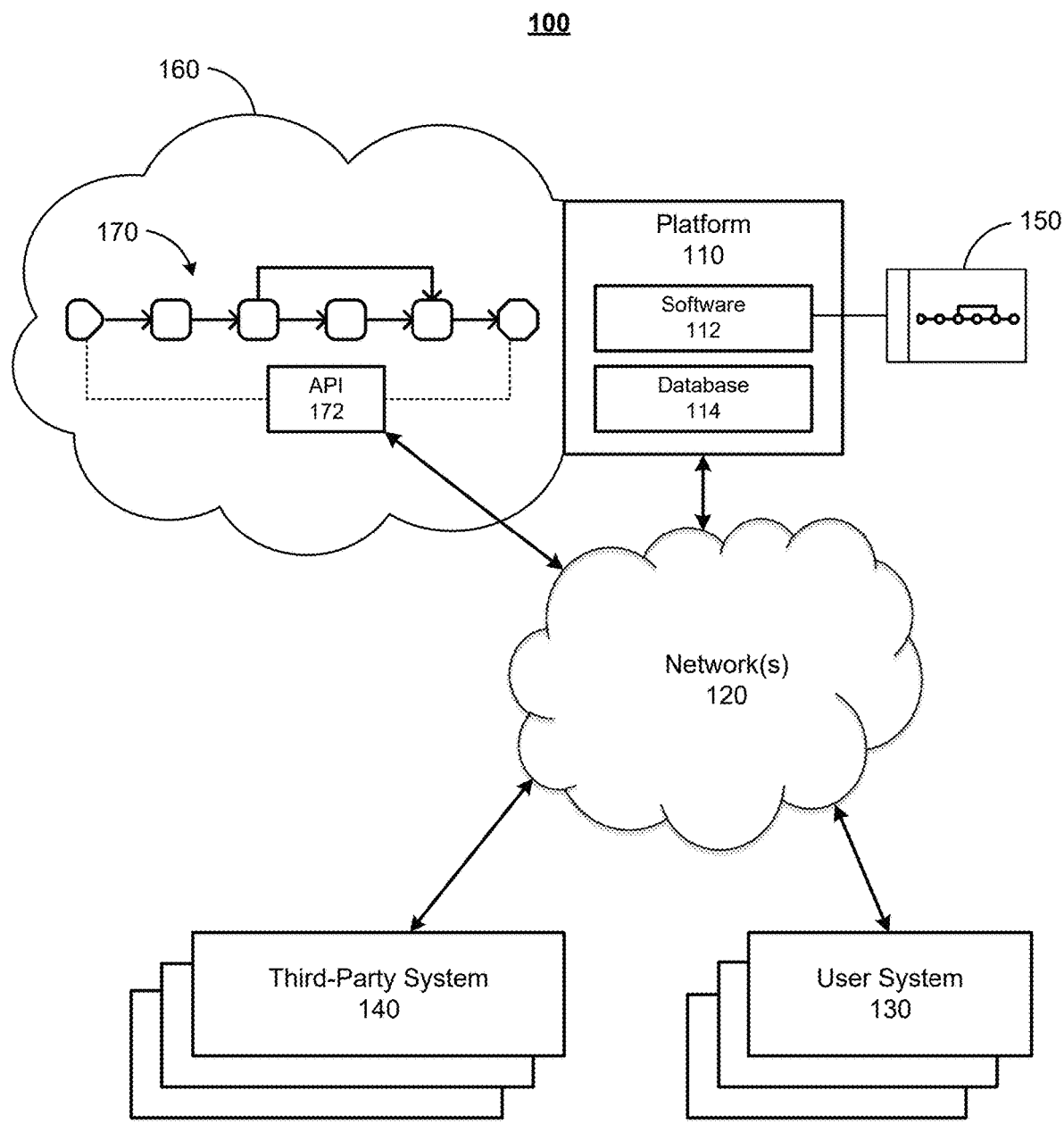
FIG. 1 illustrates an example infrastructure in which one or more of the processes described herein may be implemented, according to an embodiment.

FIG. 1 illustrates an example infrastructure 100, in which one or more of the processes described herein may be implemented, according to an embodiment. Infrastructure 100 may comprise a platform 110 which hosts and/or executes one or more of the disclosed processes, which may be implemented in software and/or hardware. Platform 110 may comprise dedicated servers, or may instead be implemented in a computing cloud, in which the resources of one or more servers are dynamically and elastically allocated to multiple tenants based on demand. In either case, the servers may be collocated and/or geographically distributed. Platform 110 may execute software 112, which may include a server application that comprises one or more software modules implementing one or more of the disclosed processes. Platform 110 may also manage one or more databases 114, which may store data used by software 112.

Platform 110 may be communicatively connected to one or more networks 120. Network(s) 120 may comprise the Internet, and communication through network(s) 120 may utilize standard transmission protocols, such as HyperText Transfer Protocol (HTTP), HTTP Secure (HTTPS), File Transfer Protocol (FTP), FTP Secure (FTPS), Secure Shell FTP (SFTP), and the like, as well as proprietary protocols. While platform 110 is illustrated as being connected to various systems, including user system(s) 130 and/or third-party system(s) 140, through a single set of network(s) 120, it should be understood that platform 110 may be connected to the various systems via different sets of one or more networks 120. For example, platform 110 may be connected to a subset of systems via the Internet, but may be connected to another subset of systems via an intranet.

As mentioned above, platform 110 may be communicatively connected to one or more user systems 130 via network(s) 120. While only a few user systems 130 are illustrated, it should be understood that platform 110 may be communicatively connected to any number of user systems 130 via network(s) 120. User system(s) 130 may comprise any type or types of computing devices capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that a user system 130 would be the personal or professional workstation of an integration developer, data engineer, or other user that has a user account for accessing various functionality of software 112 on platform 110.

Software 112 may manage an integration environment 160. In particular, software 112 may provide a graphical user interface 150 and backend functionality, including one or more of the processes disclosed herein, to enable users, via user systems 130, to construct, develop, modify, save, delete, test, deploy, undeploy, and/or otherwise manage integration processes 170 within integration environment 160. Of particular relevance to the present disclosure, the backend functionality of software 112 may include a process for automatically generating a data map to be used within an integration process 170.

Although only a single integration process 170 is illustrated, it should be understood that, in reality, integration environment 160 may comprise any number of integration processes 170. In an embodiment, integration environment 160 supports iPaaS. In this case, integration environment 160 may comprise one or a plurality of integration platforms that each comprises one or more integration processes 170. Each integration platform may be associated with an organization, which may be associated with one or more user accounts by which respective user(s) manage the organization's integration platform, including the various integration process(es) 170.

An integration process 170 may represent a transaction involving the integration of data between two or more systems, and may comprise a series of elements that specify logic and transformation requirements, including a data map, for the data to be integrated. Each element, which may also be referred to herein as a "step" and represented as a "shape" within graphical user interface 150, may retrieve or otherwise receive, transform or otherwise manipulate, route or map, and/or send data. For example, a basic integration process 170 may receive data from one or more data sources (e.g., via an application programming interface 172 of the integration process 170), manipulate the received data in a specified manner (e.g., including analyzing, normalizing, altering, updated, enhancing, and/or augmenting the received data), and send the manipulated data to one or more specified data targets. The receiving step may be performed by a connector that interfaces with the data source, and the sending step may be performed by a connector that interfaces with the data target.

An integration process 170 may represent a business workflow or a portion of a business workflow or a transaction-level interface between two systems, and comprise, as one or more elements, software modules that process data to implement the business workflow or interface. A business workflow may comprise any myriad of workflows of which an organization may repetitively have need. For example, a business workflow may comprise, without limitation, procurement of parts or materials, manufacturing a product, selling a product, shipping a product, ordering a product, billing, managing inventory or assets, providing customer service, ensuring information security, marketing, onboarding or offboarding an employee, assessing risk, obtaining regulatory approval, reconciling data, auditing data, providing information technology services, and/or any other workflow that an organization may implement in software.

The user of a user system 130 may authenticate with platform 110 using standard authentication means, to access software 112 in accordance with permissions or roles of the associated user account. The user may then interact with software 112 to construct, develop, modify, save, delete, test, deploy, undeploy, and/or otherwise manage one or more integration processes 170, for example, within a larger integration platform within integration environment 160. It should be understood that multiple users, on multiple user systems 130, may manage the same integration process(es) 170 and/or different integration processes 170 in this manner, according to the permissions or roles of their associated user accounts.

Each integration process 170, when deployed, may be communicatively coupled to network(s) 120. For example, each integration process 170 may comprise an application programming interface (API) 172 that enables clients to access integration process 170 via network(s) 120. A client may push data to integration process 170 through application programming interface 172 and/or pull data from integration process 170 through application programming interface 172.

One or more third-party systems 140 may be communicatively connected to network(s) 120, such that each third-party system 140 may communicate with an integration process 170 in integration environment 160 via application programming interface 172. Third-party system 140 may host and/or execute a software application that pushes data to integration process 170 and/or pulls data from integration process 170, via application programming interface 172. Additionally or alternatively, an integration process 170 may push data to a software application on third-party system 140 and/or pull data from a software application on third-party system 140, via an application programming interface of the third-party system 140. Thus, third-party system 140 may be a client or consumer of one or more integration processes 170, a data source for one or more integration processes 170, a data target for one or more integration processes 170, and/or the like. As examples, the software application on third-party system 140 may comprise, without limitation, enterprise resource planning (ERP) software, customer relationship management (CRM) software, accounting software, and/or the like.

2. Example Data Flow

Figure 2:
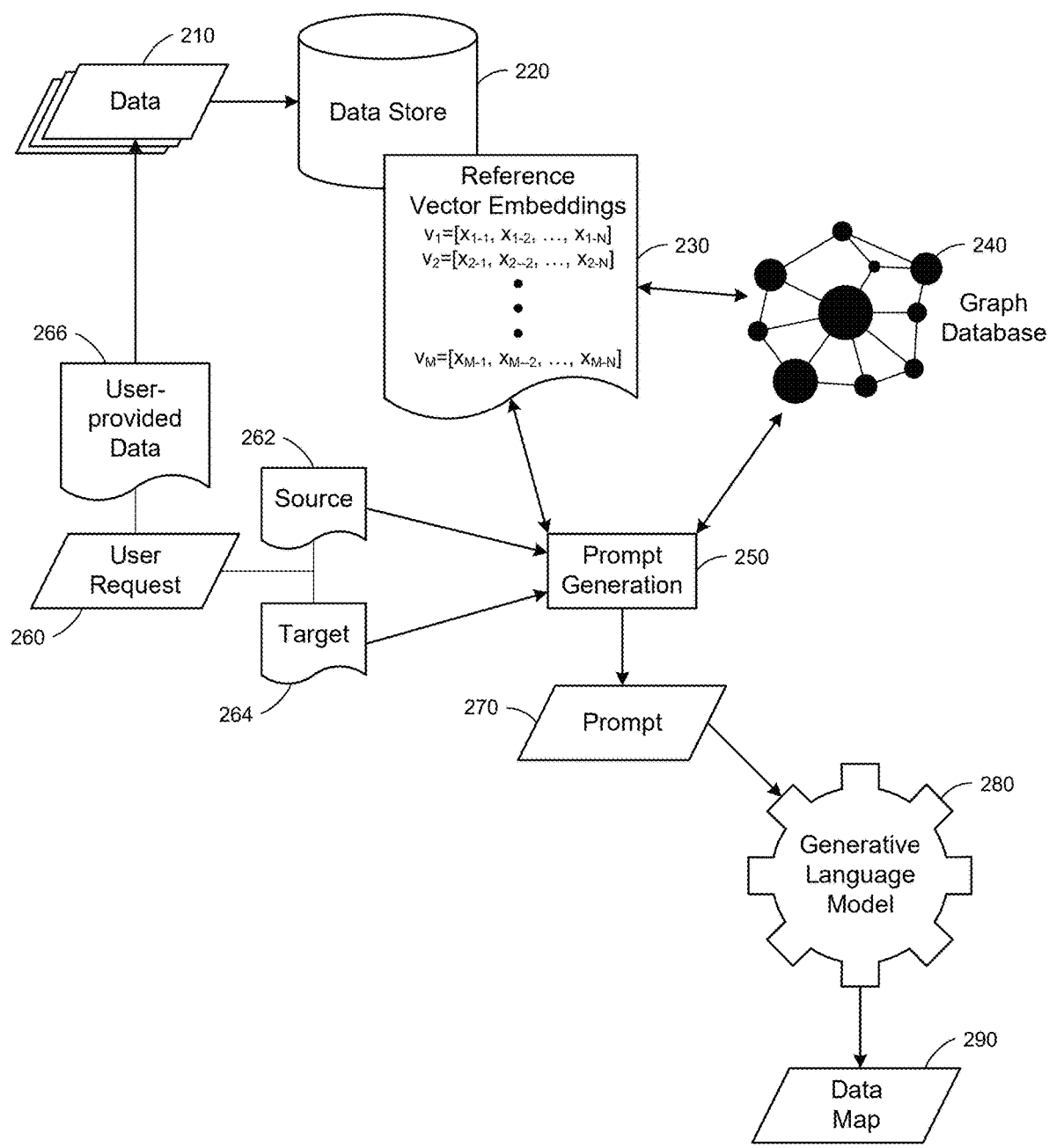
FIG. 2 illustrates an example data model for automated data mapping using semantic comparisons and artificial intelligence, according to an embodiment.

FIG. 2 illustrates an example data model 200 for automated data mapping using semantic comparisons and artificial intelligence, according to an embodiment. Initially, data 210 are acquired from one or more data sources. Data 210 may comprise one or more, and generally a plurality of, data items. Each data item in data 210 may be stored in a data store 220, which may be comprised in database 114 on platform 110.

In an embodiment, data 210 are collected from a plurality of data sources. At least a first subset of data 210 may be acquired from used-provided data 266, which may be provided with a user request 260. It should be understood that user-provided data 266 may be specifically related to user request 260 and provided (e.g., uploaded, selected, or otherwise indicated from user system 130) by the user submitting user request 260 via graphical user interface 150. At least a second subset of data 210 may be acquired from other data sources, such as integration processes 170 of a plurality of different customer's integration platforms within integration environment 160, one or more third-party systems 140, and/or the like. It should be understood that this second subset of data 210 may not be specific to any particular user request 260, but may instead represent common (e.g., crowd-sourced, scraped, etc.) data that may or may not be relevant to any particular user request 260. Data 210 may comprise or consist of the first subset of data 210, comprise or consist of the second subset of data 210, or comprise or consist of both the first subset and the second subset of data 210.

Whether user-provided or acquired from other data sources, data 210 may comprise different types of data. For example, data 210 may comprise one or more files including data definitions, path definitions or other path information, documentation (e.g., from one or more document libraries), and/or the like, that are internal to one or more integration platforms within integration environment 160 (e.g., crowd-sourced from integration platforms of a plurality of different customers). As another example, data 210 may comprise websites or other external data comprising data definitions, path definitions or other path information, documentation, and/or the like, that are external to integration environment 160 (e.g., scraped from third-party system(s) 140). As yet another example, data 210 may comprise software definitions (e.g., source code), function descriptions, scripts, API definitions, and/or the like. It should be understood that these are simply a few non-limiting examples, and that data 210 may comprise alternative or additional data that may be relevant (e.g., provide context) to a mapping from source data provided by a data source to target data to be provided to a data target.

Reference vector embeddings 230 may be determined for data 210 in data store 220. In particular, a reference vector embedding 230 may be determined for each of the plurality of data items stored in data store 220. Each data item may be stored in association with the reference vector embedding 230, that was determined for that data item, within data store 220. For each data item, the reference vector embedding 230 for the data item may define a semantic location of the data item within a vector space. The vector space has a plurality of dimensions, and each reference vector embedding 230 may define the semantic location of the data item within each of the plurality of dimensions. For example, a reference vector embedding 230 may comprise a vector having a length that is equal to the number of dimensions in the vector space, with each value (e.g., a floating-point number) in the vector representing a semantic location of the respective data item in a different one of the plurality of dimensions, and the entire vector representing the semantic location of the respective data item in all of the plurality of dimensions of the vector space. The number of dimensions in the vector space may be any number, including two, three, four, five, ten, twenty, fifty, one hundred, several hundred, one thousand, several thousand, tens of thousands, hundreds of thousands, a million, several million, tens of millions, hundreds of millions, a billion, several billion, tens of billions, hundreds of billions, or more. It should be understood that the closer the location of a first reference vector embedding 230, representing a first data item, is to the location of a second reference vector embedding 230, representing a second data item, within the vector space, the more semantically similar the first data item is to the second data item. Conversely, the farther the location of the first reference vector embedding 230 is to the location of the second reference vector embedding 230, within the vector space, the less semantically similar the first data item is to the second data item.

In an embodiment, a graph database 240 may be generated from reference vector embeddings 230. Graph database 240 may comprise a plurality of nodes and a plurality of edges. Each of the plurality of nodes may represent a cluster of reference vector embeddings 230 for a subset of the plurality of data items in data store 220. Any suitable clustering algorithm may be used to cluster reference vector embeddings 230 into the plurality of nodes. Examples of clustering algorithms include, without limitation, the k-Means algorithm, Density-Based Spatial Clustering of Applications with Noise (DBSCAN) algorithm, Gaussian Mixture Model algorithm, Balance Iterative Reducing and Clustering using Hierarchies (BIRCH) algorithm, Affinity Propagation algorithm, Mean-Shift algorithm, Ordering Points to Identify the Clustering Structure (OPTICS) algorithm, Agglomerative Hierarchy algorithm, Divisive Hierarchical algorithm, Spectral Clustering algorithm, and the like. It should be understood that, regardless of the particular clustering algorithm that is utilized, each node will represent a group of reference vector embeddings 230 that are semantically similar to each other.

Each of the plurality of edges may represent a relationship between a connected pair of the plurality of nodes in graph database 240. It should be understood that this relationship is a semantic relationship. In particular, each edge may represent that the connected pair of nodes are relatively semantically similar to each other, but less semantically similar to each other than reference vector embeddings 230 within a single node are to each other. Within graph database 240, a node may be connected to one or more other nodes via one or more edges. A pair of nodes may be considered directly connected when only a single edge must be traversed to get from one node to the other node, and a pair of nodes may be considered indirectly connected when two or more edges must be traversed to get from one node to the other node. The distance between a pair of nodes may be defined by the number of edges or "hops" between the pair of nodes. The closer a first node, representing a first group of reference vector embeddings 230, is to a second node (e.g., the fewer the number of edges between the pair of nodes), the more semantically similar the first node is to the second node. Conversely, the farther the first node is from the second node (e.g., the greater the number of edges between the pair of nodes), the less semantically similar the first node is to the second node. It is possible that a node could be connected to zero other nodes in graph database 240, signifying that the node is not sufficiently semantically similar to any other node to justify an edge.

Semantic similarity between a pair of nodes in graph database 240 may be defined as a distance between the pair of nodes within the vector space. This distance may be calculated according to any suitable metric. For example, the distance between a first node and a second node may be calculated as a maximum distance between a reference vector embedding 230 within the first node and a reference vector embedding 230 within the second node, a minimum distance between a reference vector embedding 230 within the first node and a reference vector embedding 230 within the second node, an average distance between reference vector embeddings 230 in the first node and reference vector embeddings 230 in the second node, a distance between the center of mass of the first node and the center of mass of the second node, or the like. A pair of nodes may be connected by an edge when the distance between the pair of nodes is less than or equal to a threshold distance and/or one or more other criteria are satisfied.

Prompt generation module 250 may be configured to receive a user request 260, and generate a prompt 270 based on user request 260. In particular, user request 260 may comprise source information 262 and target information 264. Source information 262 may comprise or otherwise identify at least one, and potentially a plurality of, data sources (e.g., represented as source data path(s)) from which source data are to be retrieved or otherwise received, a source profile of the source data that identifies one or more, and generally a plurality of, source entities in the source data to be provided by the data source(s), and/or the like. Similarly, target information 264 may comprise or otherwise identify at least one, and potentially a plurality of, data targets (e.g., represented as target data path(s)) to which target data are to be sent or otherwise provided, a target profile of the target data that identifies one or more, and generally a plurality of, target entities in the target data to be provided to the data target(s), and/or the like.

As used herein, the term "entity," as in "source entity" and "target entity," may refer to any unit of data or metadata provided in source data and/or target data. It is contemplated that the unit would typically be a key-value pair, with a key identifying the unit and a value of any data type. However, the unit could be any other data structure or data object that is capable of being communicated between two systems.

The data source(s) (e.g., identified by source information 262) may comprise any source of data, including a software application executing on a third-party system 140 or other system (e.g., an API of the software application), an integration process 170 within integration environment 160 or another integration environment, database 114 or another database hosted on a third-party system 140 or other system, a memory cache, and/or the like. Similarly, the data target(s) (e.g., identified by target information 264) may comprise any destination of data, including a software application executing on a third-party system 140 or other system (e.g., an API of the software application), an integration process 170 within integration environment 160 or another integration environment, database 114 or another database hosted on a third-party system 140 or other system, a memory cache, and/or the like.

Prompt generation module 250 may determine one or more input vector embeddings from user request 260, based on at least source information 262 and target information 264. For example, prompt generation module 250 may determine a first input vector embedding from source information 262 and/or determine a second input vector embedding from target information 264. Alternatively, prompt generation module 250 may determine a single input vector embedding from both source information 262 and target information 264. It should be understood that these input vector embedding(s) represent the semantic location(s) of one or more elements of user request 260 within the same vector space as reference vector embeddings 230. Thus, the input vector embeddings may be determined in an identical or similar manner as reference vector embeddings 230 are determined.

Prompt generation module 250 may have access to data store 220, reference vector embeddings 230, and/or graph database 240. Thus, prompt generation module 250 may utilize the input vector embedding(s) to search reference vector embeddings 230 in data store 220 and/or graph database 240 to identify one or more of reference vector embeddings 230 that are similar to the one or more input vector embeddings, for example, based on any suitable similarity metric. In the event that prompt generation module 250 determines a plurality of input vector embeddings from a user request 260, a separate search may be performed for each input vector embedding.

In an embodiment in which prompt generation module 250 searches reference vector embeddings 230 directly, any suitable search algorithm may be used. Examples of search algorithms include, without limitation, the k-Nearest-Neighbor (kNN) algorithm, Approximate Nearest Neighbor (ANN) algorithm, and the like. These algorithms may utilize any suitable similarity metric to identify semantically similar ones of vector embedding(s) 230. One well-known example of a similarity metric is the Euclidean distance between two vector embeddings. In the event that there were a plurality of input vector embeddings determined for a user request 260, reference vector embeddings 230 may be searched to identify a set of vector embedding(s) 230 for each individual input vector embedding.

In an embodiment in which prompt generation module 250 searches graph database 240, any suitable search algorithm may be used. Examples of search algorithms include, without limitation, the k-Nearest-Neighbor (kNN) algorithm, Approximate Nearest Neighbor (ANN) algorithm, and the like, as well as any algorithm that is capable of classifying the input vector embedding(s) into one of the plurality of nodes within graph database 240. Essentially, the search algorithm identifies the closest node, within graph database 240, to the input vector embedding(s) (i.e., the node with the least distance from the input vector embedding(s)). The distance between an input vector embedding and a node may be calculated as a maximum distance between the input vector embedding and the reference vector embeddings 230 within the node, a minimum distance between the input vector embedding and the reference vector embeddings 230 within the node, an average distance between the input vector embedding and the reference vector embeddings 230 within the node, a distance between the input vector embedding and the center of mass of the node, or the like. In the event that there were a plurality of input vector embeddings determined for a user request 260, graph database 240 may be searched to identify a closest node for each individual input vector embedding. Advantageously, the use of graph database 240 reduces the computational expense of searching vector embeddings 230, in terms of the number of semantic comparisons and the overall computational time, since only a subset of vector embeddings 230 needs to be searched. In other words, graph database 240 speeds up the search of vector embeddings 230.

For each input vector embedding that has been matched to a node in graph database 240, all or a subset (e.g., a k-nearest subset to the input vector embedding) of the vector embedding(s) 230 within the matched node may be returned in the search results. In an embodiment, all or a subset of reference vector embeddings 230 within one or more other nodes, which are semantically similar to the matched node, may also be returned in the search results. In this case, semantic similarity may be defined as the number of edges between the matched node and the other node(s). For example, other nodes within a predefined number of edges from the matched node may be determined to be semantically similar to the matched node. The predefined number of edges may be one, two, three, or any other suitable number. The ability to search nodes that are adjacent to the matched node enables prompt generation module 250 to find a wide variety of semantically similar data items (e.g., accounts, clients, customers, etc.) that may be relevant to a data mapping and aid generative language model 280 in generating a data map 290.

In an embodiment, prompt generation module 250 may search both reference vector embeddings 230 and graph database 240 to identify semantically similar reference vector embeddings 230. In this case, the two sets of search results may be combined, such that any redundant reference vector embeddings 230 are eliminated, to produce a final set of reference vector embeddings 230 that are semantically similar to the input vector embedding(s). In an alternative embodiment, prompt generation module 250 searches only graph database 240 to identify semantically similar reference vector embeddings 230. In this case, graph database 240 may act as an index into reference vector embeddings 230. In yet another alternative embodiment, graph database 240 is omitted, such that prompt generation module 250 only searches vector embeddings 230.

In the event that there are a plurality of input vector embeddings for a user request 260, prompt generation module 250 may perform a discrete search of reference vector embeddings 230 and/or graph database 240 for each input vector embedding. In this case, the search results may comprise a discrete set of semantically similar reference vector embeddings 230 for each input vector embedding. For example, prompt generation module 250 may generate a source input vector embedding from source information 262 and a target input vector embedding from target information 264. Prompt generation module 250 may then perform a first search for the source input vector embedding to produce a first search result comprising a first set of reference vector embeddings 230 that are relevant to the source, and a second search for the target input vector embedding to produce a second search result comprising a second set of reference vector embeddings 230 that are relevant to the target.

When the search of reference vector embeddings 230 and/or graph database 240 identifies one or more reference vector embeddings 230, prompt generation module 250 may retrieve the subset of the plurality of data items, within data store 220, that are associated with the identified vector embedding(s) 230. Prompt generation module 250 may then generate prompt 270 based on the retrieved subset of data items. Prompt generation module 250 may generate prompt 270, further based on source information 262 and/or target information 264. Prompt generation module 250 may generate prompt 270 by incorporating (e.g., inserting) data derived from one or more, and potentially all, of the data items in the retrieved subset of data items, as well as data derived from source information 262 and/or target information 264, into a template. As an example, the incorporated data may comprise one or more raw data items, one or more processed (e.g., formatted) data items, data extracted from one or more data items, the identity of the data source(s) from source information 262, the source profile from source information 262, the identity of the data target(s) from target information 264, the target profile from target information 264, and/or the like.

The template, used by prompt generation module 250 to generate prompt 270, may be a predefined template comprising a pre-conversation and/or post-conversation, which provide context and/or instructions for a generative language model 280, and one or more placeholders into which the data to be incorporated may be inserted. The pre-conversation and/or post-conversation may define the role of generative language model 280 (e.g., to generate a data map), define an output format for the output (e.g., a markup-language structure or other hierarchical data structure defining the data map), and/or the like. The pre-conversation and/or post-conversation may be static and stored (e.g., in database 114) for retrieval by prompt generation module 250. In this case, different pre-conversations and/or different post-conversations may be associated with different types of user requests 260, and prompt generation module 250 may select one of a plurality of available pre-conversations and/or one of a plurality of available post-conversations based on the type of user request 260 for which prompt 270 is being generated. In an alternative embodiment, the pre-conversation and/or post-conversation may be dynamically generated. In this case, prompt generation module 250 may extract information from or about user request 260, and use this information, as input to generative language model 280 or another large language model or other software module, to generate one or both of the pre-conversation and post-conversation for prompt 270 or the overall prompt 270.

In summary, prompt generation module 250 generates prompt 270 based on a retrieved subset of the plurality of data items in data store 220 that were associated with vector embedding(s) 230 returned in the result of a search of reference vector embeddings 230 and/or graph database 240, as well as potentially based on source information 262 and/or target information 264 in user request 260. Once prompt 270 has been generated, prompt generation module 250 may input prompt 270 to generative language model 280 to generate the data map 290 requested by the respective user request 260. In particular, prompt 270 may instruct generative language model 280 to generate a data map 290, based on the retrieved subset of data items, as incorporated into prompt 270, and according to a prescribed output format defined in prompt 270. Responsively, generative language model 290 may output a data map 290 between the data source, identified in source information 262, and the data target, identified in target information 264.

Generative language model 280 may be any suitable generative language model. For example, generative language model 280 may comprise or consist of a large language model. One well-known example of a large language model is the Generative Pre-trained Transformer (GPT). GPT-4 is the fourth-generation language prediction model in the GPT-n series, created by OpenAI™ of San Francisco, California. GPT-4 is an autoregressive language model that uses deep learning to produce human-like text. GPT-4 has been pre-trained on a vast amount of text from the open Internet. While GPT-4 is provided as an example, it should be understood that generative language model 280 may be any model capable of processing natural language, including past and future generations of GPT, as well as other large language models. Examples of other suitable large language models include, without limitation, the Claude family of large language models (e.g., Claude 3 Opus) developed by Anthropic PBC of San Francisco, California, the Falcon large language model (e.g., Falcon 180B) released by the United Arab Emirates' Technology Innovation Institute (TII), the Large Language Model Meta AI (LLaMA) model (e.g., LLAMA 2) released by Meta AI of New York City, New York, or the like. In an embodiment, a pre-trained generative language model, such as GPT-4 or any other mentioned or unmentioned large language model, is used as a base model that is fine-tuned for generating data maps 290 to produce generative language model 280. The particular generative language model 280 that is selected may dictate how reference vector embeddings 230 and input vector embeddings are generated. In other words, the embedding algorithm used to determine reference vector embeddings 230 and input vector embeddings may be the same embedding algorithm used by generative language model 280.

Data map 290 may comprise, for at least one source entity in the source profile of source information 262, a path definition that defines a path between that source entity and a respective target entity in the target profile of target information 264. In practice, data map 290 may comprise a plurality of path definitions that each defines a path between a different pair of source and target entities. A path definition may define a direct path between a source entity and the respective target entity, or an indirect path between a source entity and the respective target entity. In a direct path, the value of the source entity is mapped to the value of the respective target entity without any manipulation to the value of the source entity. In an indirect path, the value of the source entity is mapped to the value of the respective target entity after manipulation to the value of the source entity.

A path definition that defines an indirect path may define one or more functions that transforms the source entity into the respective target entity. In particular, the function(s) may receive the value of the source entity as an input, and apply some logic to the value of the source entity to produce the value of the respective target entity as an output. This logic may comprise calculating the value of the respective target entity from only the value of the source entity (e.g., converting to a different metric unit, data type, or format, using the value of the source entity as the only input variable in a calculation, etc.), from the value of the source entity and the value of one or more other input variables (e.g., the value of another source entity, the value of an input variable received from somewhere other than the data source, etc.), and/or the like. In the event that a path definition defines a plurality of functions, these functions may comprise inputs and outputs that are chained together along the path. In other words, a first function may receive the value of the source entity as an input and produce an intermediate output, a second function may receive the intermediate output of the first function and produce another intermediate output, a third function may receive the intermediate output of the second function and produce another intermediate output, and so on and so forth until a final function in the chain outputs the value of the respective target entity. It should be understood that there can be any number of functions along a path, including zero, one, two, three, four, five, ten, fifty, one hundred, or more. It should also be understood that a function within a path definition of data map 290 could comprise original code that is generated entirely by generative language model 280, existing code from a data item (e.g., supplied in user-provided data 266) returned in the search of vector embeddings 230, and/or code from a data item (e.g., supplied in user-provided data 266) returned in the search of vector embeddings 230 that has been modified or rewritten by generative language model 280 (e.g., to be more efficient or effective).

Data map 290 may define paths that have one source entity at one end and one target entity at the other end (i.e., one-to-one), a plurality of source entities at one end and one target entity at the other end (i.e., many-to-one), one source entity at one end and a plurality of target entities at the other end (i.e., one-to-many), a plurality of source entities at one end and a plurality of target entities at the other end (i.e., many-to-many), no source entity at one end and one target entity at the other end (i.e., zero-to-one), no source entity at one end and a plurality of target entities at the other end (i.e., zero-to-many), one source entity at one end and no target entity at the other end (i.e., one-to-zero), a plurality of source entities at one end and no target entity at the other end (i.e., many-to-zero), and/or any other potential combination of zero, one, or a plurality of source entities with zero, one, or a plurality of target entities. In each case, the path may comprise zero, one, or a plurality of functions. In a one-to-one path, the value of a single target entity is derived from the value of a single source entity without transformation or with transformation by one or more functions. In a many-to-one path, the value of a single target entity is derived from the values of a plurality of source entities, generally with transformation by one or more functions (e.g., which concatenate the source values, select one of the source values, calculate the target value using the source values as input variables, etc.). In a one-to-many path, the value of a plurality of target entities is derived from the value of a single source entity, generally with transformation by one or more functions (e.g., which split the source value, calculate the target values using the source value as an input variable, etc.). In a many-to-many path, the values of a plurality of target entities is derived from the values of a plurality of source entities, generally with transformation by one or more functions (e.g., which concatenate source values, split source values, select source values, calculate target values based on source values as input variables, etc.). In a zero-to-one or zero-to-many path, the value of a target variable may be set as a constant, the output of one or more functions that rely on and/or retrieve input variables other than the values of the source entities, and/or the like. In a one-to-zero or many-to-zero path, the value of a source entity may be provided to one or more functions that perform processing other than generating the value of any target entity. The term "many" in the above designations is only intended to denote two or more, and should not be understood to imply a significant or substantial number.

Depending on the particular source and target profiles, data map 290 may comprise path definitions that collectively define only direct paths, only indirect paths, or a combination of both direct and indirect paths. For example, in the event that there are a plurality of source entities and a plurality of target entities, data map 290 may comprise, for a first one of the plurality of source entities, a first path definition that defines a direct path between the first source entity and a first one of the plurality of target entities, and for a second one of the plurality of source entities, a second path definition that defines one or more functions that transform the second source entity into a second one of the plurality of target entities. However, as discussed above, the path definitions in data map 290 do not necessarily need to map a source entity to a target entity (e.g., in a zero-to-one, zero-to-many, one-to-zero, or many-to-zero path).

Data map 290 may represent a suggestion to the user, who submitted user request 260, for a data map between the data source and the data target, or may be automatically incorporated into an overarching process and/or deployed to map data from the data source to the data target. In an embodiment that utilizes data map 290 within integration environment 160, data map 290 may be automatically (i.e., without user intervention), semi-automatically (e.g., with user modification and/or approval), or manually (i.e., by the user) incorporated into an integration process 170, for example, as a map shape on a virtual canvas being used by the user to construct integration process 170. In particular, the data map 290, produced by data model 200 for a user request 260, may be incorporated into the respective integration process 170 at a position between the data source(s) and data target(s), identified in the user request 260, in the respective integration process 170.

For example, a visual representation of data map 290 may be displayed within graphical user interface 150. The visual representation of data map 290 may comprise visual identifiers of the one or more source entities in the source profile and/or the one or more target entities in the target profile, and a visual representation of the path between at least one of the one or more source entities and at least one of the one or more target entities. In an embodiment, the visual representation of data map 290 comprises a visual identifier of each and every one of the source entities in the source profile and each and every one of the target entities in the target profile, a visual representation of each and every path defined in data map 290, including any one-to-one, many-to-one, one-to-many, many-to-many, zero-to-one, zero-to-many, one-to-zero, and/or many-to-zero paths, generated by generative language model 280 as path definitions in data map 290. In addition, when a path comprises one or more functions that transform at least one source entity into at least one target entity, the visual representation of the path may comprise a visual representation of each function. The visual representation of the function may depict one or more inputs (e.g., names of the input variables) to the function and one or more outputs (e.g., names of the output variables) from the function, and optionally one or more other attributes of the function (e.g., a function name), for example, within a rectangular box representing the function.

3. Example Process for Constructing Model

Figure 3:
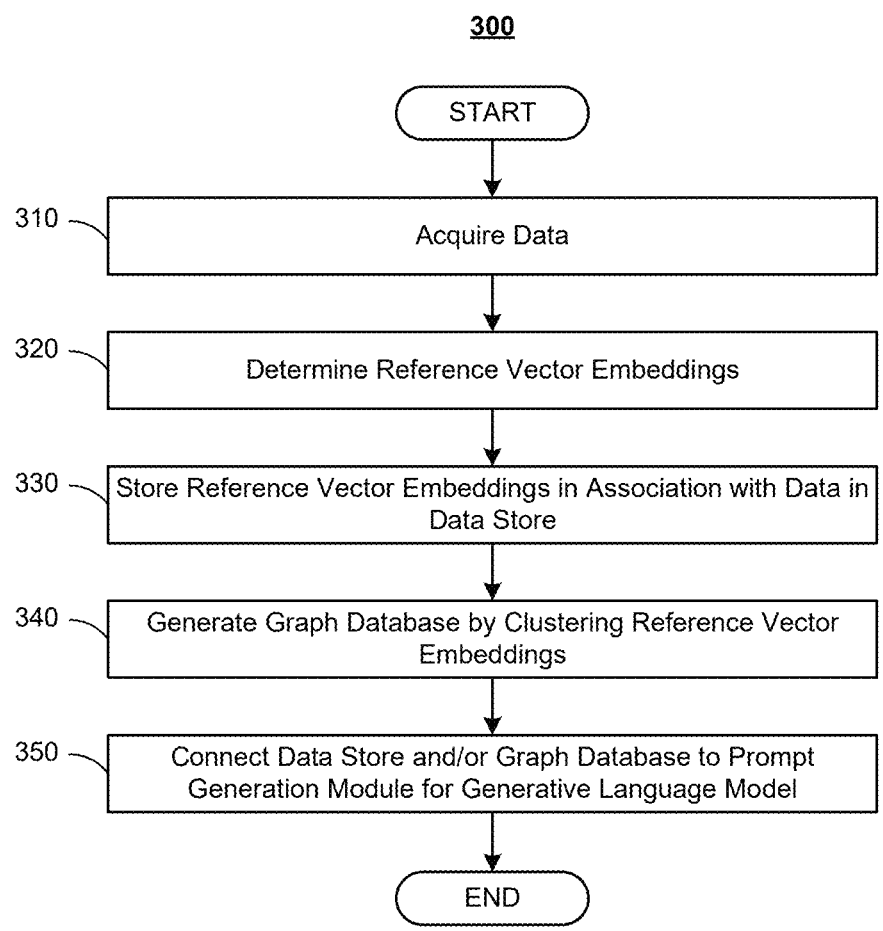
FIG. 3 illustrates an example process for constructing a data model that provides automated data mapping using semantic comparisons and artificial intelligence, according to an embodiment.

FIG. 3 illustrates an example process 300 for constructing data model 200 to provide automated data mapping using semantic comparisons and artificial intelligence, according to an embodiment. Process 300 may be implemented by software 112. Data model 200 may comprise data store 220, reference vector embeddings 230, graph database 240, prompt generation module 250, and/or generative language model 280.

While process 300 is illustrated with a certain arrangement and ordering of subprocesses, process 300 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

In subprocess 310, data 210 may be acquired from one or more local and/or global data sources, such as integration environment 160, graphical user interface 150, other components of platform 110, one or more user systems 130 (e.g., user-provided data 266 from one or more users), one or more third-systems 140, and/or the like. Data 210 may comprise a plurality of data items. Examples of a data item include, without limitation a data definition, a path definition or other path information, documentation, source code, a function description, a script, an API definition, or the like. It should be understood that the plurality of data items may comprise a combination of any of these and/or any other types of data items, and may include tens, hundreds, thousands, millions, billions, trillions, or more distinct data items. In addition, it should be understood that data 210 may comprise structured data, semi-structured data, and/or unstructured data.

In subprocess 320, a reference vector embedding 230 is determined for each of the plurality of data items in data 210. Each reference vector embedding 230 defines a semantic location of the data item within a vector space that has a plurality of dimensions, as discussed elsewhere herein. Reference vector embeddings 230 may be generated from the data items using any suitable embedding algorithm, including potentially a machine-learning algorithm. Examples of embedding algorithms that may be used to generate reference vector embeddings 230 include, without limitation, Doc2Vec (also known as Paragraph Vector), Skip-Thought vector embedding, the Probabilistic Latent Semantic Indexing (PLSI) model, Latent Dirichlet Allocation (LDA), or the like. More generally, any algorithm for embedding text and/or documents into a vector space may be used.

In subprocess 330, reference vector embeddings 230, as determined in subprocess 320, are stored in association with data 210 in data store 220. In particular, for each of the plurality of data items in data 210, the data item may be stored in association with the respective reference vector embedding 230, determined for that data item in subprocess 320, within data store 220. Thus, data store 220 will comprise a plurality of data items and a corresponding plurality of reference vector embeddings 230. In an embodiment, data store 220 is indexed by reference vector embeddings 230, such that any data item may be retrieved by its respective reference vector embedding 230.

In subprocess 340, a graph database 240 may be generated by clustering reference vector embeddings 230 into a plurality of nodes. As discussed elsewhere herein, any suitable clustering algorithm may be used to group semantically similar reference vector embeddings 230 into clusters. The resulting graph database 240 may comprise a plurality of nodes and a plurality of edges. Each of the plurality of nodes may represent a cluster of reference vector embeddings 230 for a subset of the plurality of data items in data store 220, and each of the plurality of edges may represent a relationship between a connected pair of the plurality of nodes. In an embodiment that does not utilize graph database 240, subprocess 340 may be omitted.

In subprocess 350, data store 220 and/or graph database 240 may be connected to prompt generation module 250 for generative language model 280. In particular, prompt generation module 250 may be provided with access to data store 220, and, in an embodiment that comprises graph database 240, access to graph database 240 as well. Access to data store 220 may be provided via an API of data store 220 or in any other suitable manner. Similarly, access to graph database 240 may be provided via an API of graph database 240 or in any other suitable manner. In an alternative embodiment, data store 220 and/or graph database 240 may be connected to prompt generation module 250 by incorporating data store 220 and/or graph database 240 into prompt generation module 250.

By virtue of this connection, prompt generation module 250 is capable of searching data store 220 and/or graph database 240 for reference vector embeddings 230. In an embodiment that does not comprise graph database 240, prompt generation module 250 may be configured to directly search reference vector embeddings 230 in data store 220. In an embodiment that does comprise graph database 240, prompt generation module 250 may be configured to directly search both data store 220 and graph database 240. Alternatively, prompt generation module 250 may be configured to only directly search graph database 240, and then use the reference vector embeddings 230, identified in that search, as indices into data store 220.

4. Example Process for Operating Model

Figure 4:
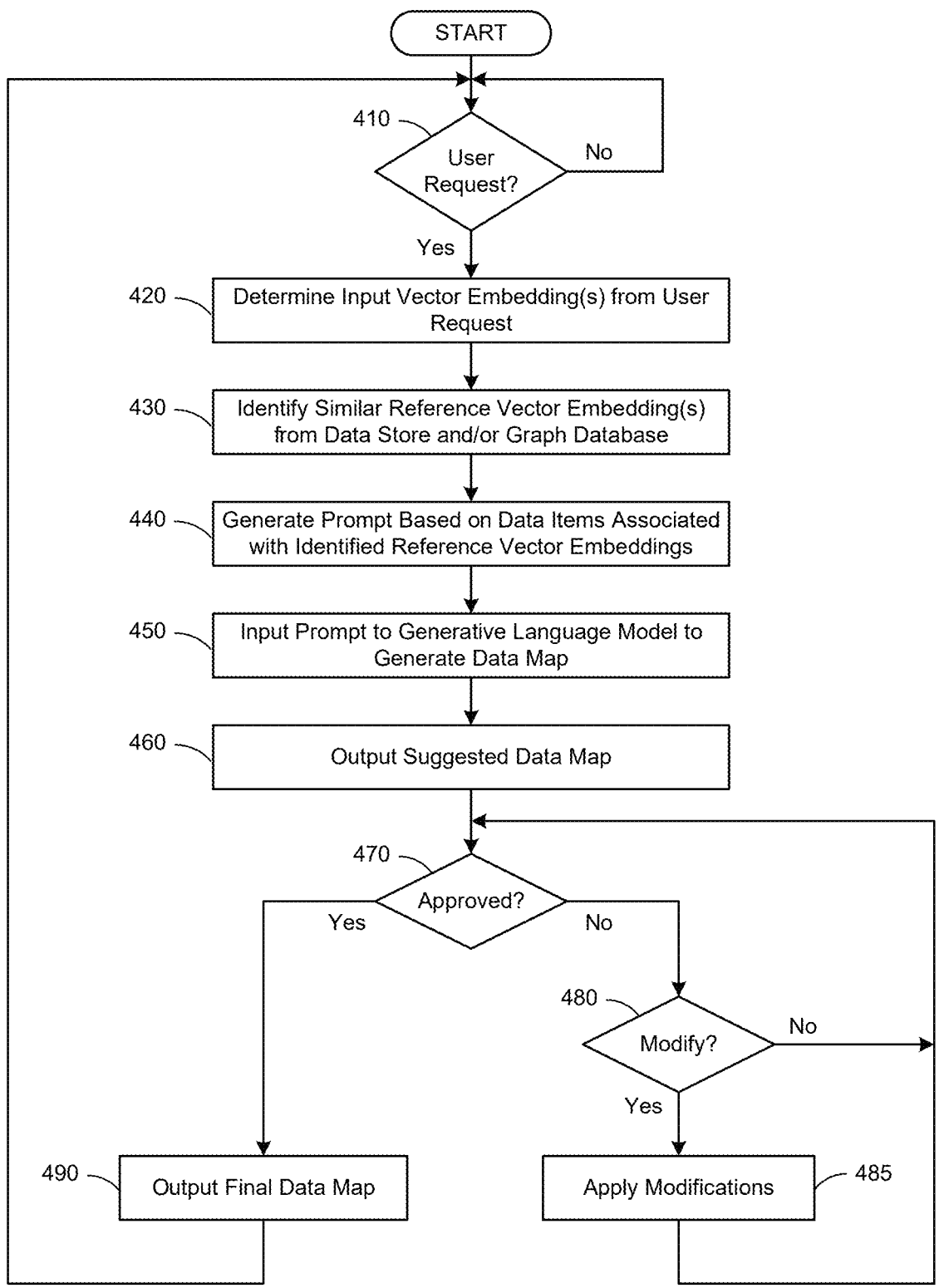
FIG. 4 illustrates an example process for performing automated data mapping using semantic comparisons and artificial intelligence, according to an embodiment.

FIG. 4 illustrates an example process 400 for performing automated data mapping using semantic comparisons and artificial intelligence, according to an embodiment. Process 400 may be implemented by software 112. It should be understood that process 400 utilizes data model 200 constructed by process 300. In particular, users may utilize data model 200 to automatically generate data maps 290, for example, while constructing integration processes 170 within integration environment 160 via graphical user interface 150.

While process 400 is illustrated with a certain arrangement and ordering of subprocesses, process 400 may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Process 400 may be made available to users of platform 110. For example, process 400 may be implemented as a service, in software 112, that is available to developers of integration processes 170 within integration environment 160. For instance, users may have access to process 400, via graphical user interface 150, as a tool to aid in the construction of an integration process 170, for example, on a virtual canvas within graphical user interface 150. An example of such a virtual canvas is described in U.S. Pat. No. 8,533,661, issued on Sep. 10, 2013, which is hereby incorporated herein by reference as if set forth in full. Users may utilize process 400 to automatically generate data maps 290, for incorporation into their respective integration processes 170, based on user requests 260.

In subprocess 410, process 400 waits for a user request 260 for a data map 290 to be received. When a user request 260 is received (i.e., "Yes" in subprocess 410), process 400 proceeds to subprocess 420. Otherwise, while no user request 260 is received (i.e., "No" in subprocess 410), process 400 continues to wait for a user request 260. It should be understood that the remainder of process 400 (i.e., subprocess 420-490) may be performed for each of one or more user requests 260 for a data map 290 that are received.

A user request 260 may be received in any suitable manner. For example, access to process 400 may be provided via an input within graphical user interface 150. In particular, a user may utilize a virtual canvas, within graphical user interface 150, to drag and drop and configure shapes, representing steps, into an integration process 170. These steps may include a connection to at least one data source and a connection to at least one data target. The virtual canvas may comprise an input for automatically generating a data map 290 between the data source(s) and the data target(s) within the integration process 170 being constructed.

Each user request 260 may comprise source information 262 and target information 264. Source information 262 may identify the data source(s), comprise a source profile that identifies one or more source entities in the source data to be provided by the data source(s), comprise other metadata about the data source(s), and/or the like. Target information 264 may identify the data target(s), comprise a target profile that identifies one or more target entities in the target data to be provided to the data target(s), comprise other metadata about the data target(s), and/or the like.

A user request 260 may also comprise user-provided data 266, which may be incorporated into data 210 and for which reference vector embeddings may be determined and added to reference vector embeddings 230. User-provided data 266 may comprise data that are specific to user request 260, and which may have been specifically curated by the user. In an embodiment, all of data 210 may be specific to a user request 260, in which case data 210 may consist solely of user-provided data 266. In this case, data store 220 may be dynamically generated for each user request 260, solely from user-provided data 266 that are included in that user request 260. Alternatively, data 210 may consist of only data acquired from data sources other than user request 260, or may comprise both user-provided data 266 and data acquired from data sources other than user request 260.

In subprocess 420 (e.g., implemented by prompt generation module 250), one or more input vector embeddings may be determined from the user request 260 that was received. In particular, at least one input vector embedding, within the same vector space as reference vector embeddings 230, may be determined based on source information 262 and/or target information 264. The input vector embedding(s) may be determined in subprocess 420 in an identical or similar manner as reference vector embeddings 230 were determined in subprocess 320 (e.g., using the same embedding algorithm). A first input vector embedding may be determined from a source profile or other data related the data source in source information 262, and a second input vector embedding may be determined from a target profile or other data related to the data target in target information 264. Alternatively, a single input vector embedding may be determined from the source profile or other data related to the data source in source information 262 and the target profile or other data related to the data target in target information 264.

In subprocess 430 (e.g., implemented by prompt generation module 250), one or more semantically similar reference vector embeddings 230 may be identified from data store 220 and/or graph database 240. In particular, as discussed elsewhere herein, the reference vector embeddings 230 in data store 220 and/or graph database 240 may be searched to identify one or more reference vector embeddings 230 that are similar to the input vector embedding(s) based on a similarity metric. It should be understood that this similarity represents a semantic similarity.

As an example, the input vector embedding(s) may represent the location of the source entities, in the source profile, within the vector space, and/or the location of the target entities, in the target profile, within the vector space. These source entities and target entities may be individually represented in two respective input vector embeddings, or collectively represented in a single input vector embedding. In this example, the reference vector embeddings 230 may represent referential static and/or dynamic data mappings between source entities and target entities, derived from data 210, including, for example, data definitions, path definitions or other path information, documentation, source code, function descriptions, scripts, API definitions, and/or the like. Thus, the input vector embedding(s), representing desired data source(s) and target(s), are compared to reference vector embeddings 230, representing known data mappings, to identify those known data mappings that are semantically similar to the desired data source(s) and data target(s).

In subprocess 440, a prompt 270 is generated based on the data item(s) associated with the vector embedding(s) 230 that were identified in subprocess 430. In particular, the subset of the plurality of data items that are associated with the identified vector embedding(s) 230 may be retrieved from data store 220, for example, using each identified vector embedding as an index into data store 220. Then, prompt 270 may be generated based on the subset of data items that was retrieved. For example, prompt 270 may be generated by retrieving or dynamically generating a template with a pre-conversation and/or post-conversation, and incorporating data from the subset of data item into the template, to produce a prompt 270 that instructs generative language model 280 to generate a data map 290 based on the incorporated data. This incorporated data may comprise raw and/or processed data from the subset of data items, an identity of the data source(s) (e.g., from source information 262), a source profile of the source data from the data source(s) (e.g., from source information 262) an identity of the data target(s) (e.g., from target information 264), a target profile of the target data to be provided to the data target(s) (e.g., from target information 264), and/or the like.

In subprocess 450, the prompt 270 that was generated in subprocess 440 is input to generative language model 280 (e.g., a large language model) to generate data map 290. Prompt 270 may comprise text written in natural language (i.e., with syntax and grammar that would be expected in human speech), to instruct generative language model 280 to generate a data map 290, according to a prescribed format, based on the data incorporated into prompt 270. The prescribed format may be a data structure (e.g., expressed in a hierarchical markup language) that can be readily converted into an executable step within an integration process 170. Thus, little to nothing may be required to convert data map 290, as output by generative language model 280, into an actual software module that can be executed as part of an integration process 170 in integration environment 160.

In subprocess 460, the data map 290 that was generated by generative language model 280 may be outputted as a suggestion. As discussed elsewhere herein, data map 290 may comprise one or more path definitions. Each path definition defines a path between the source data and/or the target data. A path may be direct (i.e., without any interstitial functions) or indirect (e.g., via one or more interstitial functions that transform the data), and may be one-to-one, many-to-one, one-to-many, many-to-many, zero-to-one, zero-to-many, one-to-zero, or many-to-zero. The data map 290, including the path definition(s), may be visually represented within graphical user interface 150, such that the user, who submitted user request 260 in subprocess 410, may view data map 290, including each source entity, each target entity, and each path defined by data map 290. The visual representation may comprise one or more inputs that enable the user to approve data map 290 and/or modify data map 290.

In subprocess 470, process 400 may determine whether or not data map 290 has been approved. The user may approve data map 290 by selecting an approval input within graphical user interface 150. When data map 290 has been approved (i.e., "Yes" in subprocess 470), process 400 may proceed to subprocess 490. Otherwise, as long as data map 290 has not been approved (i.e., "No" in subprocess 470), process 400 may proceed to subprocess 480.

In subprocess 480, process 400 may determine whether or not data map 290 is to be modified. For example, graphical user interface 150 may comprise one or more inputs for modifying data map 290. The user may utilize these input(s) to modify data map 290 in any manner, including editing existing path definitions, adding new path definitions, deleting existing path definitions, and/or the like. The input(s) may enable the user to draw new paths, change the source of an existing path, change the target of an existing path, add, edit, or delete functions along a path, and/or the like, in an intuitive manner, for example, on a virtual canvas. When the user modifies data map 290 (i.e., "Yes" in subprocess 480), process 400 may proceed to subprocess 485. Otherwise, as long as data map 290 has not been modified (i.e., "No" in subprocess 480), process 400 may return to subprocess 470 to await approval or modification of data map 290.

In subprocess 485, one or more modifications to data map 290 may be applied. In particular, any modifications, received from the user in subprocess 480, may be applied to data map 290, to produce a modified data map 290. Then, process 400 may return to subprocess 470 to await approval or further modification of the modified data map 290.

In subprocess 490, the final (i.e., approved) data map 290 may be outputted. This output may comprise generating a shape, as an iconic representation of data map 290, and adding the shape to other shapes, representing an integration process 170 being constructed on the virtual canvas in graphical user interface 150. For example, the shape for data map 290 may be added to the virtual canvas at a position between the data source(s), identified in source information 262 of user request 260, and the data target(s), identified in target information 264 of user request 260. Once placed as a shape on the virtual canvas, the user may move, edit, configure, or delete the data map 290 represented by the shape in the same manner as any other shape on the virtual canvas. Once the user has completed construction of the entire integration process 170, the user may then save integration process 170 within database 114 and/or deploy integration process 170 for execution within integration environment 160.

In an alternative embodiment, data map 290 may be automatically deployed. In this embodiment, subprocesses 460-480 may be omitted. In other words, the data map 290 that is generated by generative language model 280 may be automatically saved to database 114 and/or deployed to a production environment (e.g., within integration environment 160) to begin mapping data from data source(s) to data target(s).

5. Example Graphical User Interface

Figure 5:
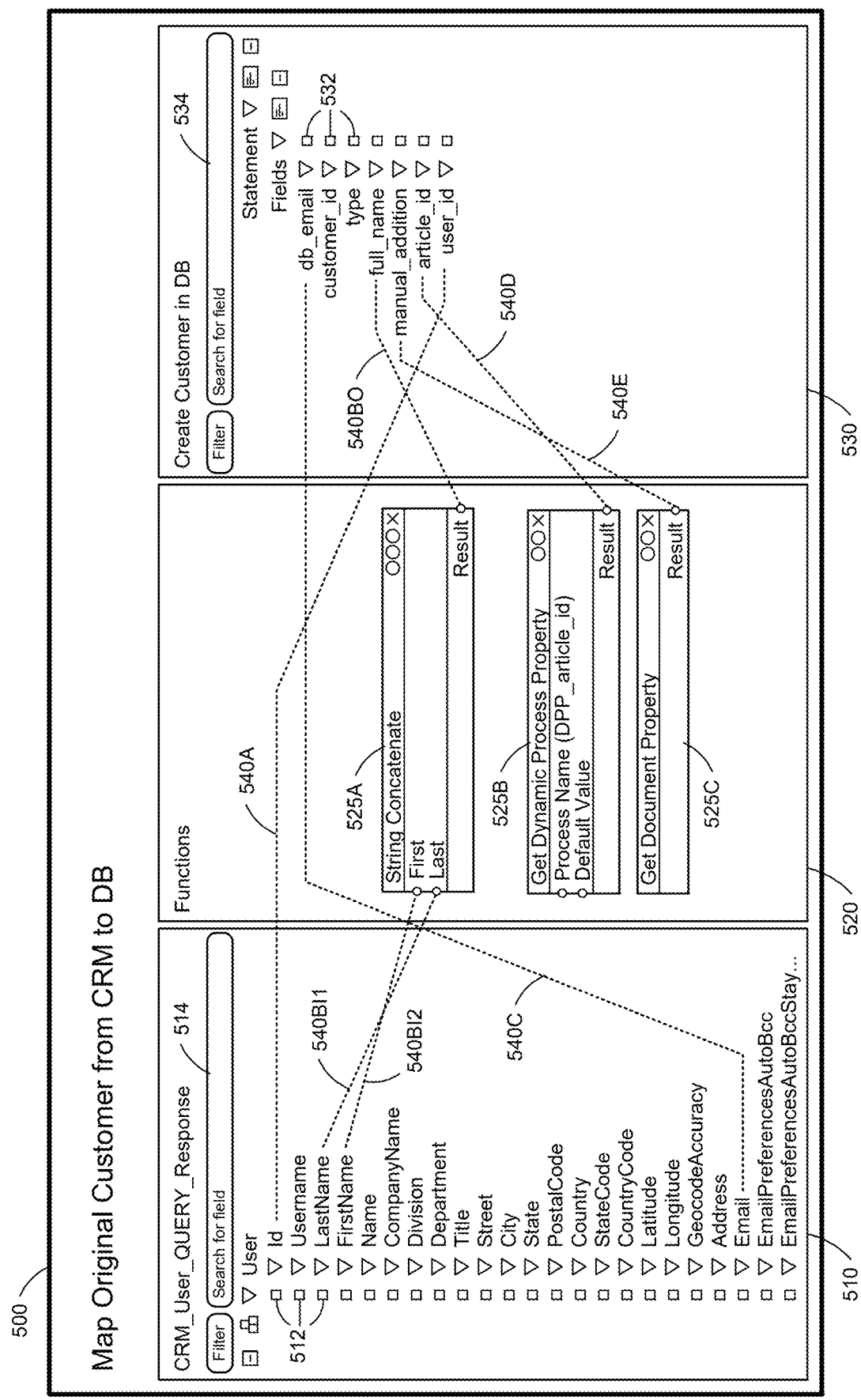
FIG. 5 illustrates an example screen of a graphical user interface for displaying a data map, according to an embodiment.

FIG. 5 illustrates an example screen 500 of graphical user interface 150 for displaying data map 290, according to an embodiment. It should be understood that screen 500 represents one example of the visual representation of data map 290 in subprocess 460 of process 400. In this example, data map 290 maps customers from a third-party CRM application (e.g., on a third-party system 140 or within integration environment 160) as the data source to an internal database (e.g., within integration environment 160 or an on-premises system) as the data target.

Screen 500 may comprise a source frame 510, a functions frame 520, and a target frame 530. Source frame 510 may comprise a list of source entities 512 (e.g., from the source profile in source information 262 or acquired from data item(s) associated with any identified reference vector embeddings 230), and optionally, a search input 514 for searching source entities 512 (e.g., by keyword). Similarly, target frame 530 may comprise a list of target entities 532 (e.g., from the target profile in target information 264 or acquired from data item(s) associated with any identified reference vector embeddings 230), and optionally, a search input 534 for searching target entities 532 (e.g., by keyword). Functions frame 520 may comprise visual representations 525 of functions, if any, within the path definitions in data map 290. The visual representation 525 of each function may include the name of the function, the name of each input, if any, to the function, the name of each output, if any, to the function, one or more inputs for editing, deleting, and/or performing other actions on the function, and/or the like, within a rectangular box.

Screen 500 comprises a visual representation 540 of each path definition in data map 540, illustrated as visual representations 540A, 540B, 540C, 540D, and 540E. Visual representations 540A and 540C each represents a direct path between a single source entity 512 and a single target entity 532. Visual representation 540B represents an indirect many-to-one path that comprises a function 525A, which receives a last name along path branch 540BI1 and a first name along path branch 540BI2, as a pair of source entities 512, concatenates the last name to the first name, and outputs a full name along path branch 540B0 as a target entity 532. Visual representation 540D represents a zero-to-one path that comprises a function 525B, which receives inputs from another data source and outputs a result as a target entity 532. Visual representation 540E represents a zero-to-one path that comprises a function 525C, which receives no inputs and outputs a result as a target entity 532. for example, function 525C may retrieve and output the value of a property that is common to all data sources.

Although not specifically illustrated, screen 500 may comprise one or more inputs that enable the user to modify data map 290. In particular, screen 500 may be configured to enable the user to edit, delete, or add functions 525, change one or both of the end points of each visual representation 540 of a path definition to redefine a source entity 512 and/or target entity 532 on the path, and/or the like. It should also be noted that source entities 512 and target entities 532 may be hierarchical, and screen 500 may comprise inputs for expanding and collapsing various branches in the hierarchies to aid in navigation of the lists of source entities 512 and target entities 532. In addition, screen 500 may comprise an input for saving, approving, and/or deploying data map 290, once the user is satisfied with data map 290.

6. Example Application

Disclosed embodiments enable a developer or other user on platform 110 (e.g., for managing an integration platform on an iPaaS platform) to easily generate data maps 290 using semantic comparisons and artificial intelligence. The developer simply needs to identify a data source and a data target, and process 400 will automatically generate a data map 290 for mapping data between the identified data source and data target. The developer no longer needs to manually define the data map or rely on static data mappings, thereby removing the onus of understanding the various data profiles from the developer.

Once generated, a data map 290 may be incorporated into any number of integration processes 170 within an integration platform. In particular, data map 290 may be stored (e.g., by software 112 in database 114) as a discrete object that can be incorporated into any integration process 170. For example, data map 290 may be available as a shape, on a virtual canvas of graphical user interface 150, that can be dragged and dropped into an appropriate position within any integration process 170 being constructed on the virtual canvas. This enables data map 290 to be used and reused in a simple, repeatable, and extensible manner, in any one or more integration processes 170.

Data map 290 may be executed as a step within an integration process 170 within the runtime engine of integration environment 160. As an example, the runtime engine may be a Boomi Atom™, which is coded in Java, so as to run in a Java Virtual Machine (JVM). However, it should be understood that the integration process 170 may be executed in other runtime engines, potentially coded in other programming languages.

It should be understood that data map 290, when deployed and executed within an integration process 170, may map data from one or more data sources to one or more data targets within an integration. This data mapping may be performed in real time, as data are received from the data source(s), for real-time data flow. As used herein, the term "real time" should be understood to include both scenarios in which events occur simultaneously, as well as scenarios in which events are separated in time by ordinary latencies in processing, memory access, communications, and/or the like. Alternatively or additionally, this data mapping may be performed in one or more batches and/or in any other manner.

Embodiments have primarily been described herein as generating data maps 290 for integration processes 170. However, it should be understood that the disclosed embodiments may be used to generate data maps 290 for any process in any application. Accordingly, processes 300 and 400 are not limited to an integration platform or any particular context. More generally, a data map 290 may be automatically generated, according to disclosed embodiments, and deployed to map any data from any data source to any data target, to communicate data between two systems, transform the data between two systems, synchronize the data between two systems, and/or the like.

State-of-the-art solutions that automate data mapping rely on deterministic rules and require static path definitions. In contrast, disclosed embodiments use vector embeddings 230, and potentially a graph database 240, to semantically compare a user request 260 to both static and dynamic path definitions, as well as potentially other semantically useful content (e.g., documentation, source code, function descriptions, scripts, API definitions, etc.), and automatically generate a comprehensive and dynamic data map 290, based on the semantic comparison, using a generative language model 280. The resulting data map 290 may include all path definitions, including any necessary interstitial functions. Graph database 240 may be used to speed up searching and identify other semantically similar data, beyond just path definitions. Notably, due to the use of generative language model 280, disclosed embodiments are able to generate data maps 290, even when the data source(s), source data, data target(s), and/or target data are not fully known or defined.

7. Example Processing System

Figure 6:
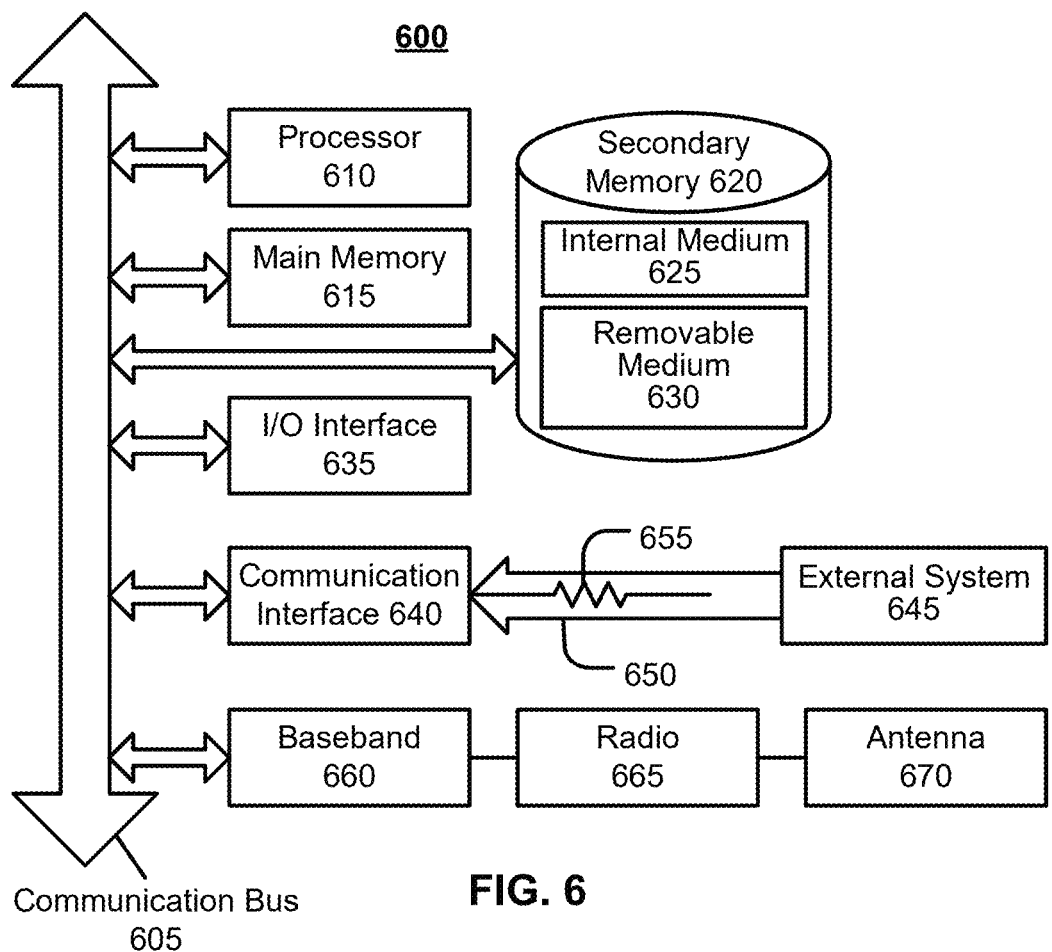
FIG. 6 illustrates an example processing system, by which one or more of the processes described herein may be executed, according to an embodiment.

FIG. 6 illustrates an example processing system, by which one or more of the processes described herein may be executed, according to an embodiment. For example, system 600 may be used to store and/or execute software (e.g., software 112, database 114, etc.) that implements data model 200, process 300, and/or process 400, and/or may represent components of platform 110, user system(s) 130, third-party system(s) 140, and/or other processing devices described herein. System 600 can be any processor-enabled device (e.g., server, personal computer, etc.) that is capable of wired or wireless data communication. Other processing systems and/or architectures may also be used, as will be clear to those skilled in the art.

System 600 may comprise one or more processors 610. Processor(s) 610 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a subordinate processor (e.g., back-end processor), an additional microprocessor or controller for dual or multiple processor systems, and/or a coprocessor. Such auxiliary processors may be discrete processors or may be integrated with a main processor 610. Examples of processors which may be used with system 600 include, without limitation, any of the processors (e.g., Pentium™, Core i7™, Core i9™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor(s) 610 may be connected to a communication bus 605. Communication bus 605 may include a data channel for facilitating information transfer between storage and other peripheral components of system 600. Furthermore, communication bus 605 may provide a set of signals used for communication with processor 610, including a data bus, address bus, and/or control bus (not shown). Communication bus 605 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and/or the like.

System 600 may comprise main memory 615. Main memory 615 provides storage of instructions and data for programs executing on processor 610, such as any of the software discussed herein. It should be understood that programs stored in the memory and executed by processor 610 may be written and/or compiled according to any suitable language, including without limitation C/C++, Java, JavaScript, Perl, Python, Visual Basic, .NET, and the like. Main memory 615 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

System 600 may comprise secondary memory 620. Secondary memory 620 is a non-transitory computer-readable medium having computer-executable code and/or other data (e.g., any of the software disclosed herein, including software 112) stored thereon. In this description, the term "computer-readable medium" is used to refer to any non-transitory computer-readable storage media used to provide computer-executable code and/or other data to or within system 600. The computer software stored on secondary memory 620 is read into main memory 615 for execution by processor 610. Secondary memory 620 may include, for example, semiconductor-based memory, such as programmable read-only memory (PROM), erasable programmable read-only memory (EPROM), electrically erasable read-only memory (EEPROM), and flash memory (block-oriented memory similar to EEPROM).

Secondary memory 620 may include an internal medium 625 and/or a removable medium 630. Internal medium 625 and removable medium 630 are read from and/or written to in any well-known manner. Internal medium 625 may comprise one or more hard disk drives, solid state drives, and/or the like. Removable storage medium 630 may be, for example, a magnetic tape drive, a compact disc (CD) drive, a digital versatile disc (DVD) drive, other optical drive, a flash memory drive, and/or the like.

System 600 may comprise an input/output (I/O) interface 635. I/O interface 635 provides an interface between one or more components of system 600 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing systems, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch-panel display (e.g., in a smartphone, tablet computer, or other mobile device).

System 600 may comprise a communication interface 640. Communication interface 640 allows software to be transferred between system 600 and external devices, networks, or other information sources. For example, computer-executable code and/or data may be transferred to system 600 from a network server via communication interface 640. Examples of communication interface 640 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 600 with a network (e.g., network(s) 120) or another computing device. Communication interface 640 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software transferred via communication interface 640 is generally in the form of electrical communication signals 655. These signals 655 may be provided to communication interface 640 via a communication channel 650 between communication interface 640 and an external system 645. In an embodiment, communication channel 650 may be a wired or wireless network (e.g., network(s) 120), or any variety of other communication links. Communication channel 650 carries signals 655 and can be implemented using a variety of wired or wireless communication means including wire or cable, fiber optics, conventional phone line, cellular phone link, wireless data communication link, radio frequency ("RF") link, or infrared link, just to name a few.

Computer-executable code is stored in main memory 615 and/or secondary memory 620. Computer-executable code can also be received from an external system 645 via communication interface 640 and stored in main memory 615 and/or secondary memory 620. Such computer-executable code, when executed, enables system 600 to perform the various functions of the disclosed embodiments as described elsewhere herein.

In an embodiment that is implemented using software, the software may be stored on a computer-readable medium and initially loaded into system 600 by way of removable medium 630, I/O interface 635, or communication interface 640. In such an embodiment, the software is loaded into system 600 in the form of electrical communication signals 655. The software, when executed by processor 610, preferably causes processor 610 to perform one or more of the processes described elsewhere herein.

System 600 may optionally comprise wireless communication components that facilitate wireless communication over a voice network and/or a data network (e.g., in the case of user system 130). The wireless communication components comprise an antenna system 670, a radio system 665, and a baseband system 660. In system 600, radio frequency (RF) signals are transmitted and received over the air by antenna system 670 under the management of radio system 665.

In an embodiment, antenna system 670 may comprise one or more antennae and one or more multiplexors (not shown) that perform a switching function to provide antenna system 670 with transmit and receive signal paths. In the receive path, received RF signals can be coupled from a multiplexor to a low noise amplifier (not shown) that amplifies the received RF signal and sends the amplified signal to radio system 665.

In an alternative embodiment, radio system 665 may comprise one or more radios that are configured to communicate over various frequencies. In an embodiment, radio system 665 may combine a demodulator (not shown) and modulator (not shown) in one integrated circuit (IC). The demodulator and modulator can also be separate components. In the incoming path, the demodulator strips away the RF carrier signal leaving a baseband receive audio signal, which is sent from radio system 665 to baseband system 660.

If the received signal contains audio information, then baseband system 660 decodes the signal and converts it to an analog signal. Then the signal is amplified and sent to a speaker. Baseband system 660 also receives analog audio signals from a microphone. These analog audio signals are converted to digital signals and encoded by baseband system 660. Baseband system 660 also encodes the digital signals for transmission and generates a baseband transmit audio signal that is routed to the modulator portion of radio system 665. The modulator mixes the baseband transmit audio signal with an RF carrier signal, generating an RF transmit signal that is routed to antenna system 670 and may pass through a power amplifier (not shown). The power amplifier amplifies the RF transmit signal and routes it to antenna system 670, where the signal is switched to the antenna port for transmission.

Baseband system 660 is communicatively coupled with processor(s) 610, which have access to memory 615 and 620. Thus, software can be received from baseband processor 660 and stored in main memory 610 or in secondary memory 620, or executed upon receipt. Such software, when executed, can enable system 600 to perform one or more of the processes described elsewhere herein.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

As used herein, the terms "comprising," "comprise," and "comprises" are open-ended. For instance, "A comprises B" means that A may include either: (i) only B; or (ii) B in combination with one or a plurality, and potentially any number, of other components. In contrast, the terms "consisting of," "consist of," and "consists of" are closed-ended. For instance, "A consists of B" means that A only includes B with no other component in the same context.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A method comprising using at least one hardware processor to:

for each of a plurality of data items, determine a reference vector embedding for the data item that defines a semantic location of the data item within a vector space, wherein the vector space has a plurality of dimensions, and store the data item in association with the reference vector embedding within a data store;

generate a graph database that comprises a plurality of nodes and a plurality of edges, wherein each of the plurality of nodes represents a cluster of reference vector embeddings for a subset of the plurality of data items, and wherein each of the plurality of edges represents a relationship between a connected pair of the plurality of nodes; and for each of one or more user requests for a data map, each user request comprising source information and target information, determine at least one input vector embedding within the vector space based on the source information and the target information, search one or both of the reference vector embeddings in the data store or the graph database to identify one or more reference vector embeddings that are semantically similar to the at least one input vector embedding based on a similarity metric, retrieve a subset of the plurality of data items associated with the identified one or more reference vector embeddings, generate a prompt based on the subset of data items, input the prompt to a generative language model to generate the data map, and output the data map.

2. The method of claim 1, wherein the generative language module is a large language model.

3. The method of claim 1, wherein the source information identifies at least one data source, and wherein the target information identifies at least one data target.

4. The method of claim 3, wherein generating the prompt comprises incorporating one or both of an identity of the at least one data source or an identity of the at least one data target into the prompt.

5. The method of claim 3, wherein one or both of:
    the at least one data source is a plurality of data sources; or
    the at least one data target is a plurality of data targets.

6. The method of claim 3, wherein the at least one data source comprises a memory cache.

7. The method of claim 1, wherein the source information comprises a source profile, identifying one or more source entities in source data to be provided by at least one data source, and wherein the target information comprises a target profile, identifying one or more target entities in target data to be provided to at least one data target.

8. The method of claim 7, wherein generating the prompt comprises incorporating one or both of the source profile or the target profile into the prompt.

9. The method of claim 7, wherein the data map comprises, for at least one of the one or more source entities in the source profile, a path definition that defines a path between the at least one source entity and a respective target entity in the target profile.

10. The method of claim 9, wherein the path definition defines a direct path between the at least one source entity and the respective target entity.

11. The method of claim 9, wherein the path definition defines one or more functions that transform the at least one source entity into the respective target entity.

12. The method of claim 7, wherein the one or more source entities are a plurality of source entities, wherein the one or more target entities are a plurality of target entities, and wherein the data map comprises:
- for a first one of the plurality of source entities, a first path definition that defines a direct path between the first source entity and a first one of the plurality of target entities; and
- for a second one of the plurality of source entities, a second path definition that defines one or more functions that transform the second source entity into a second one of the plurality of target entities.

13. The method of claim 1, wherein the plurality of data items comprises one or more of a data definition, path information, or documentation.

14. The method of claim 1, wherein the plurality of data items comprises one or more of source code, a function description, a script, or an application programming interface (API) definition.

15. The method of claim 1, wherein outputting the data map comprises displaying a visual representation of the data map within a graphical user interface, wherein the visual representation of the data map comprises visual identifiers of one or more source entities and one or more target entities, and a visual representation of a path between at least one of the one or more source entities and at least one of the one or more target entities.

16. The method of claim 15, wherein, when the path comprises a function that transforms the at least one source entity into the at least one target entity, the visual representation of the path comprises a visual representation of the function, and wherein the visual representation of the function depicts one or more inputs to the function and one or more outputs from the function.

17. The method of claim 1, further comprising using the at least one hardware processor to, for each of the one or more user requests, incorporate the data map into an integration process at a position between at least one data source and at least one data target in the integration process.

18. The method of claim 1, further comprising using the at least one hardware processor to, for at least one of the one or more user requests, deploy the data map to map data from at least one data source to at least one data target in real time.

19. A system comprising:
- at least one hardware processor; and
- software that is configured to, when executed by the at least one hardware processor,
  - for each of a plurality of data items, determine a reference vector embedding for the data item that defines a semantic location of the data item within a vector space, wherein the vector space has a plurality of dimensions, and store the data item in association with the reference vector embedding within a data store,
  - generate a graph database that comprises a plurality of nodes and a plurality of edges, wherein each of the plurality of nodes represents a cluster of reference vector embeddings for a subset of the plurality of data items, and wherein each of the plurality of edges represents a relationship between a connected pair of the plurality of nodes, and
  - for each of one or more user requests for a data map, each user request comprising source information and target information,
    - determine at least one input vector embedding within the vector space based on the source information and the target information,
    - search one or both of the reference vector embeddings in the data store or the graph database to identify one or more reference vector embeddings that are semantically similar to the at least one input vector embedding based on a similarity metric,
    - retrieve a subset of the plurality of data items associated with the identified one or more reference vector embeddings,
    - generate a prompt based on the subset of data items,
    - input the prompt to a generative language model to generate the data map, and
    - output the data map.

20. A non-transitory computer-readable medium having instructions stored therein, wherein the instructions, when executed by a processor, cause the processor to:
- for each of a plurality of data items, determine a reference vector embedding for the data item that defines a semantic location of the data item within a vector space, wherein the vector space has a plurality of dimensions, and store the data item in association with the reference vector embedding within a data store;
- generate a graph database that comprises a plurality of nodes and a plurality of edges, wherein each of the plurality of nodes represents a cluster of reference vector embeddings for a subset of the plurality of data items, and wherein each of the plurality of edges represents a relationship between a connected pair of the plurality of nodes; and
- for each of one or more user requests for a data map, each user request comprising source information and target information,
  - determine at least one input vector embedding within the vector space based on the source information and the target information,
  - search one or both of the reference vector embeddings in the data store or the graph database to identify one or more reference vector embeddings that are semantically similar to the at least one input vector embedding based on a similarity metric,
  - retrieve a subset of the plurality of data items associated with the identified one or more reference vector embeddings,
  - generate a prompt based on the subset of data items,
  - input the prompt to a generative language model to generate the data map, and
  - output the data map.

* * * * *